March 7, 1933.　　　F. MÜLLER　　　1,899,976
AUTOMATIC CHAIN ASSEMBLING MEANS
Filed Aug. 1, 1929　　　11 Sheets-Sheet 1

Inventor
Friederich Müller
By Gifford, Scull & Burgess
Attorneys.

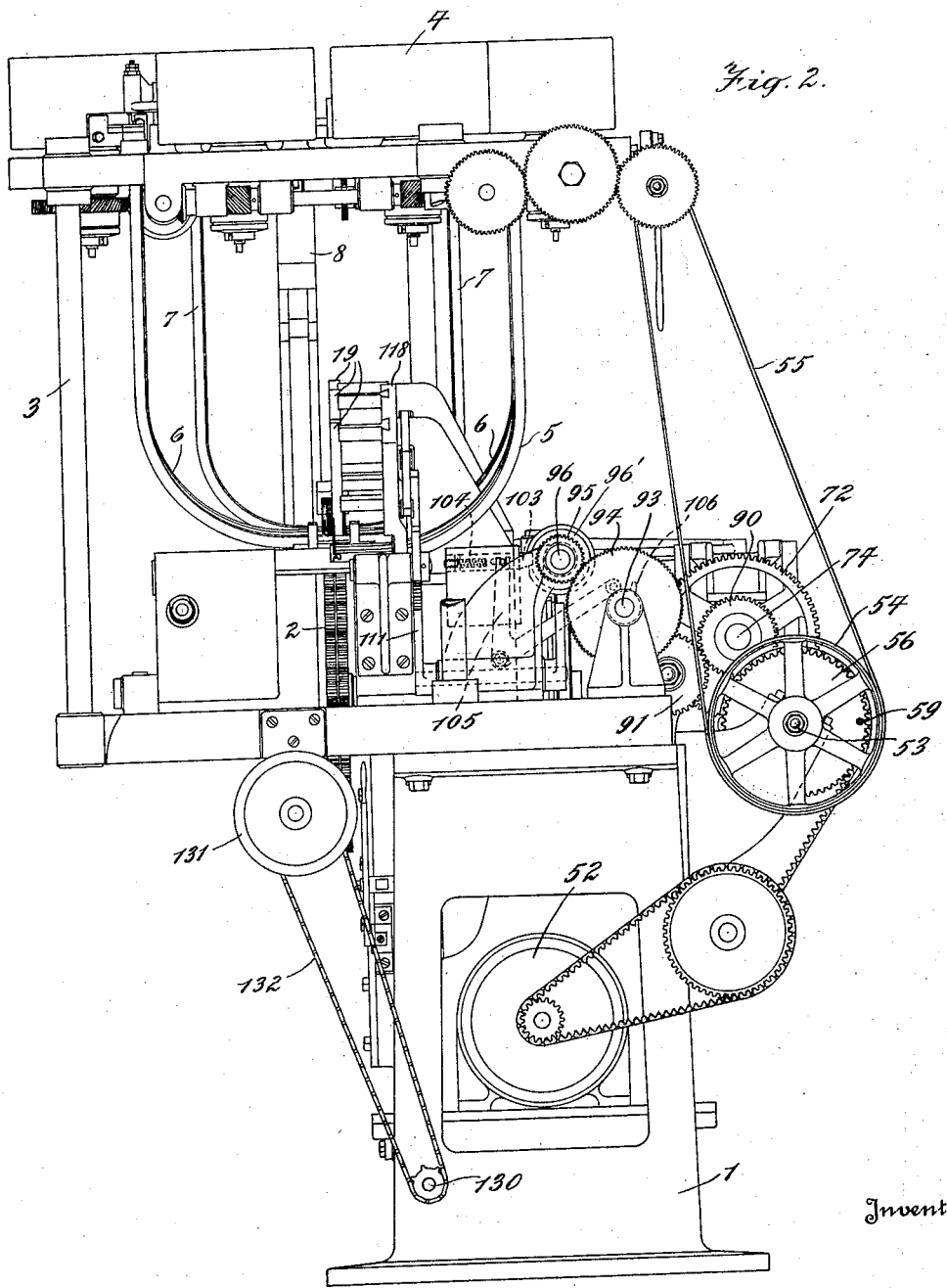

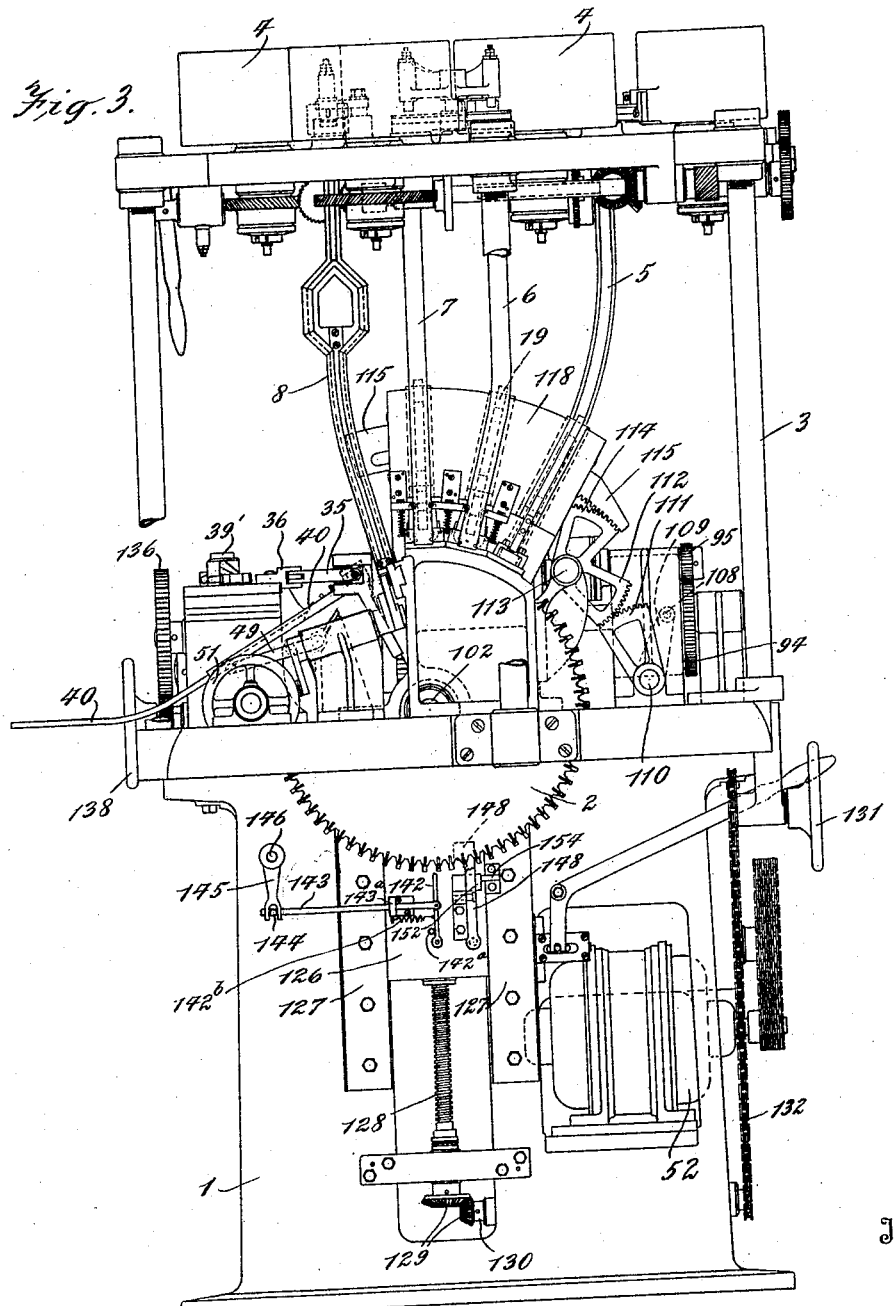

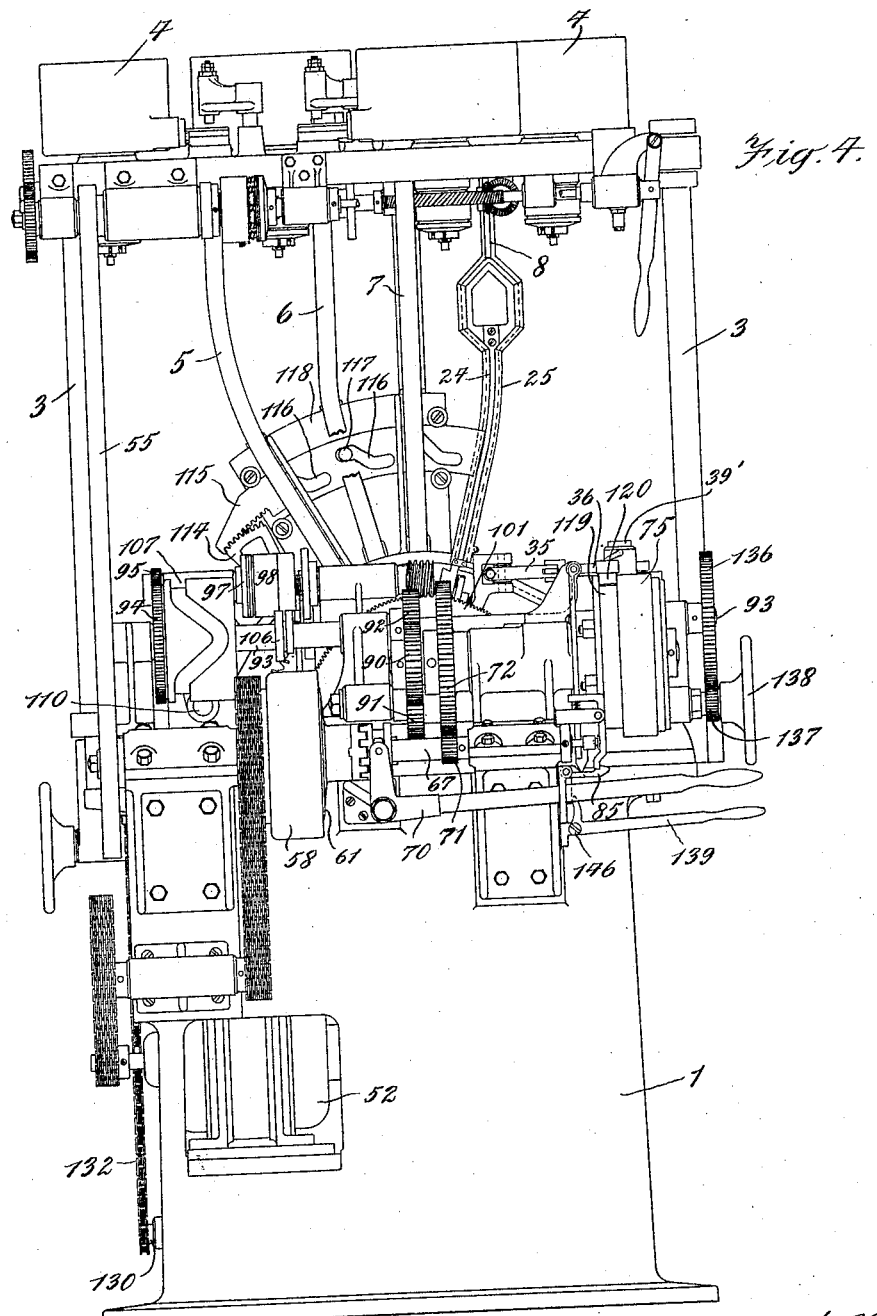

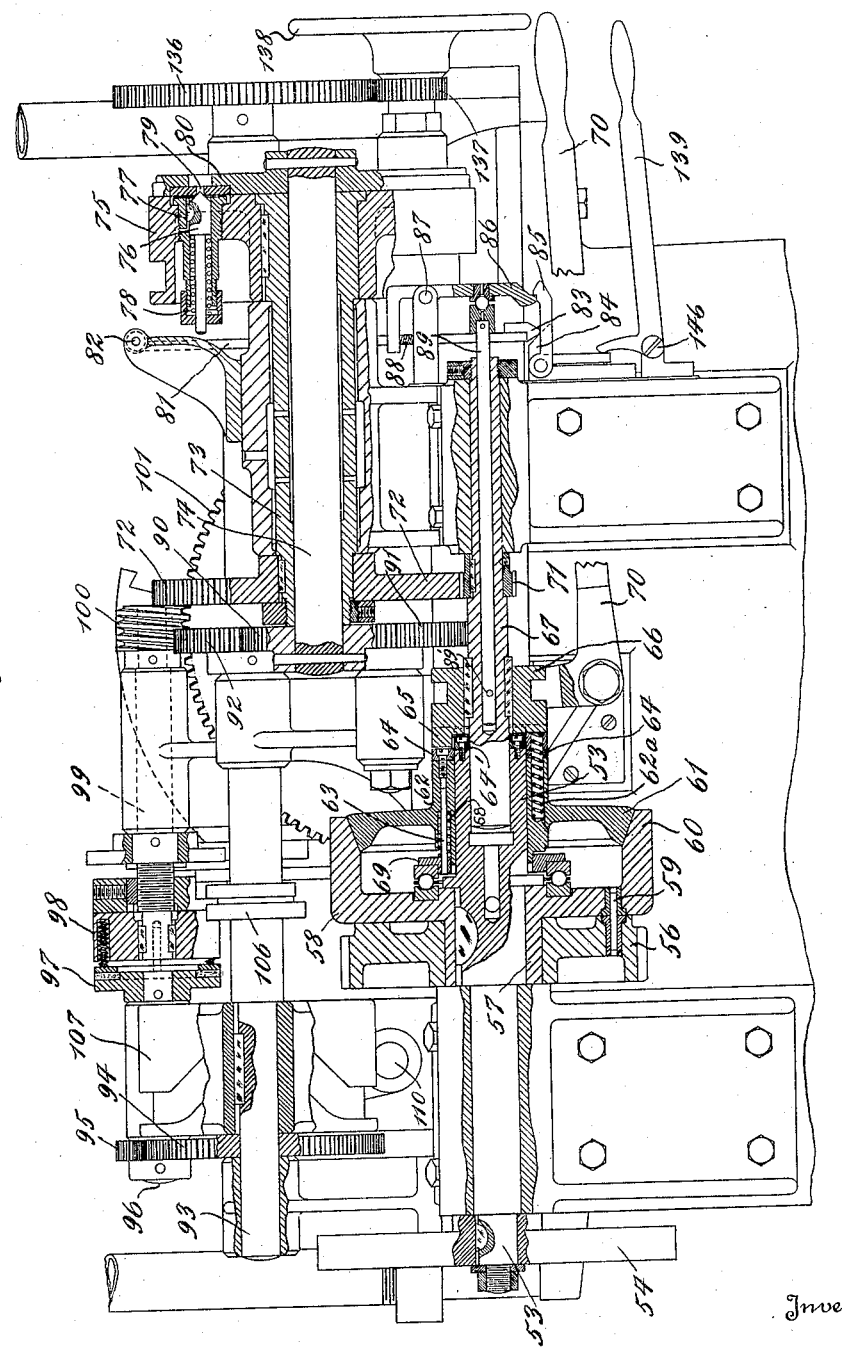

March 7, 1933.　　　　F. MÜLLER　　　　1,899,976
AUTOMATIC CHAIN ASSEMBLING MEANS
Filed Aug. 1, 1929　　　11 Sheets-Sheet 6
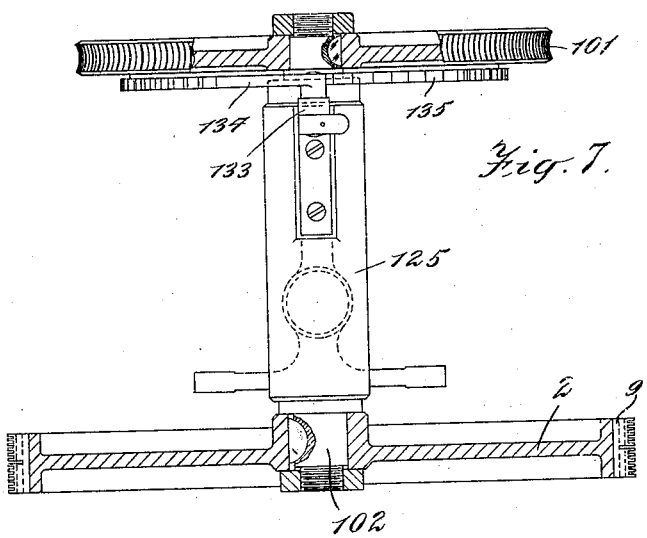
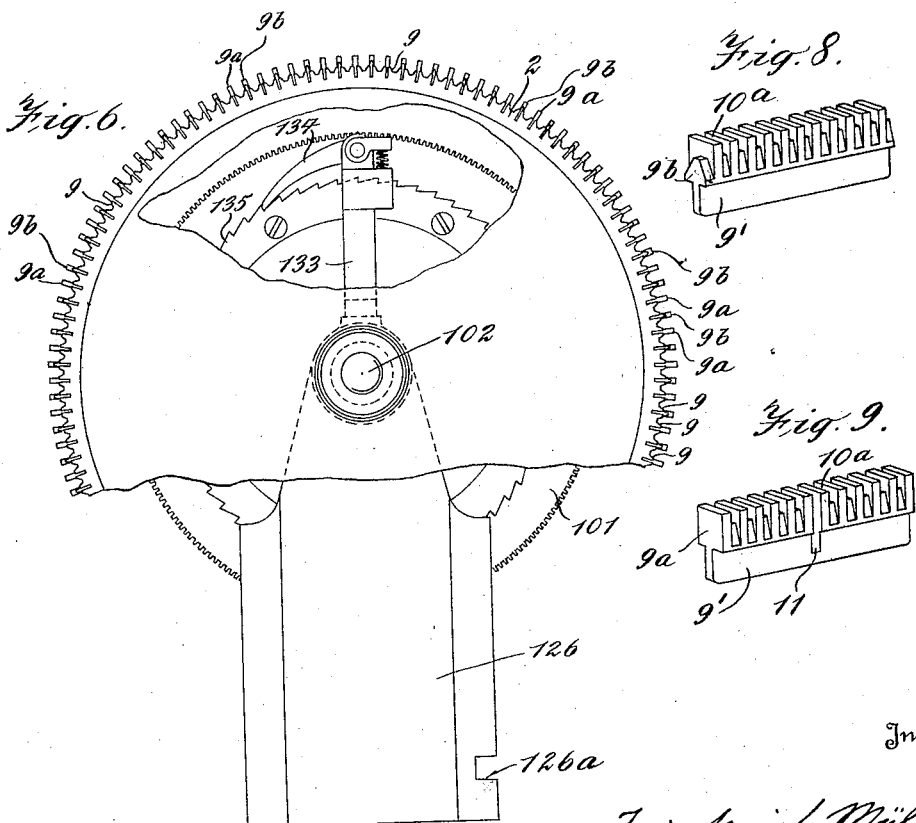
Inventor
Friederich Müller
By Gifford, Scull & Burgess
Attorneys.

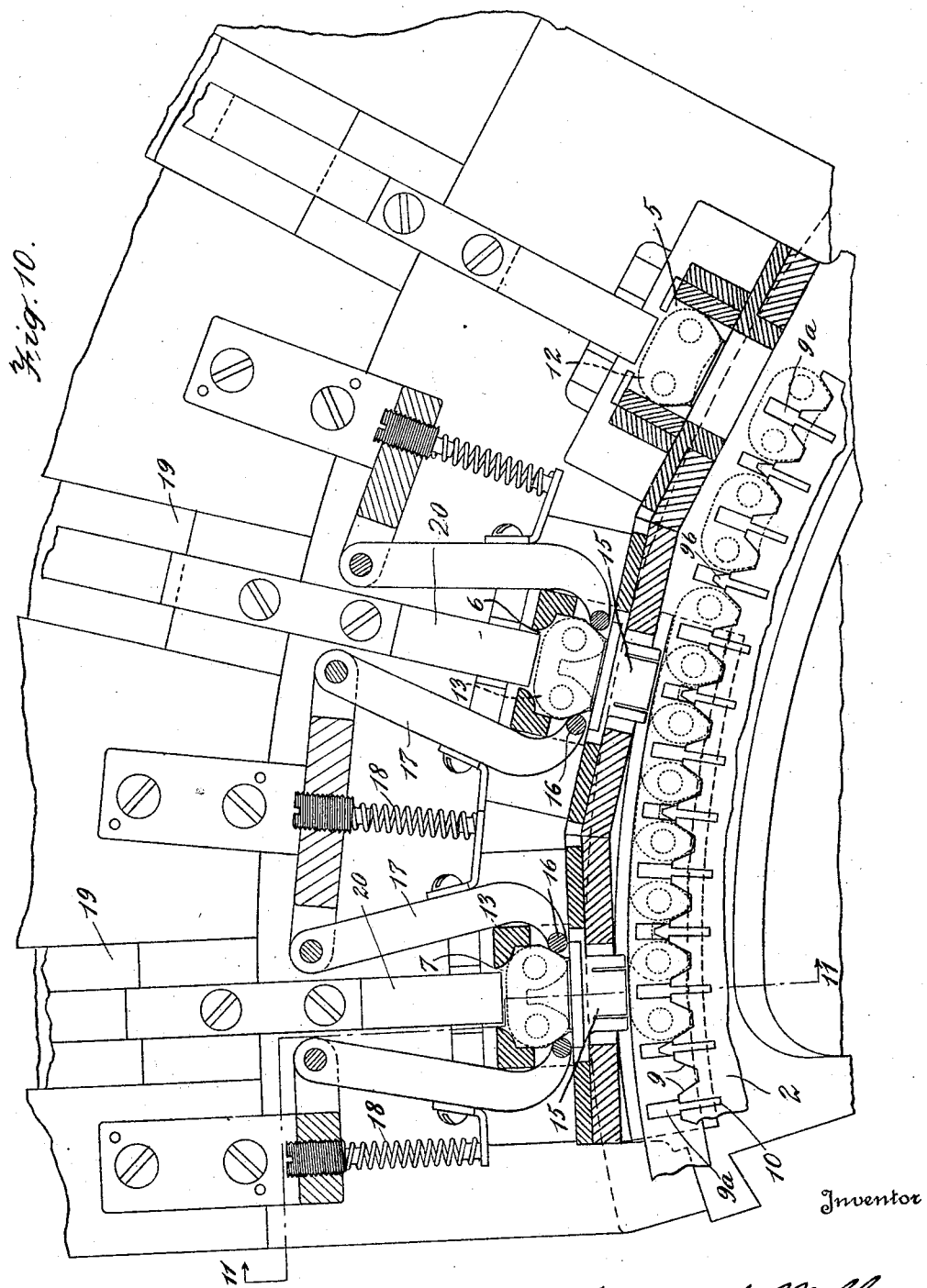

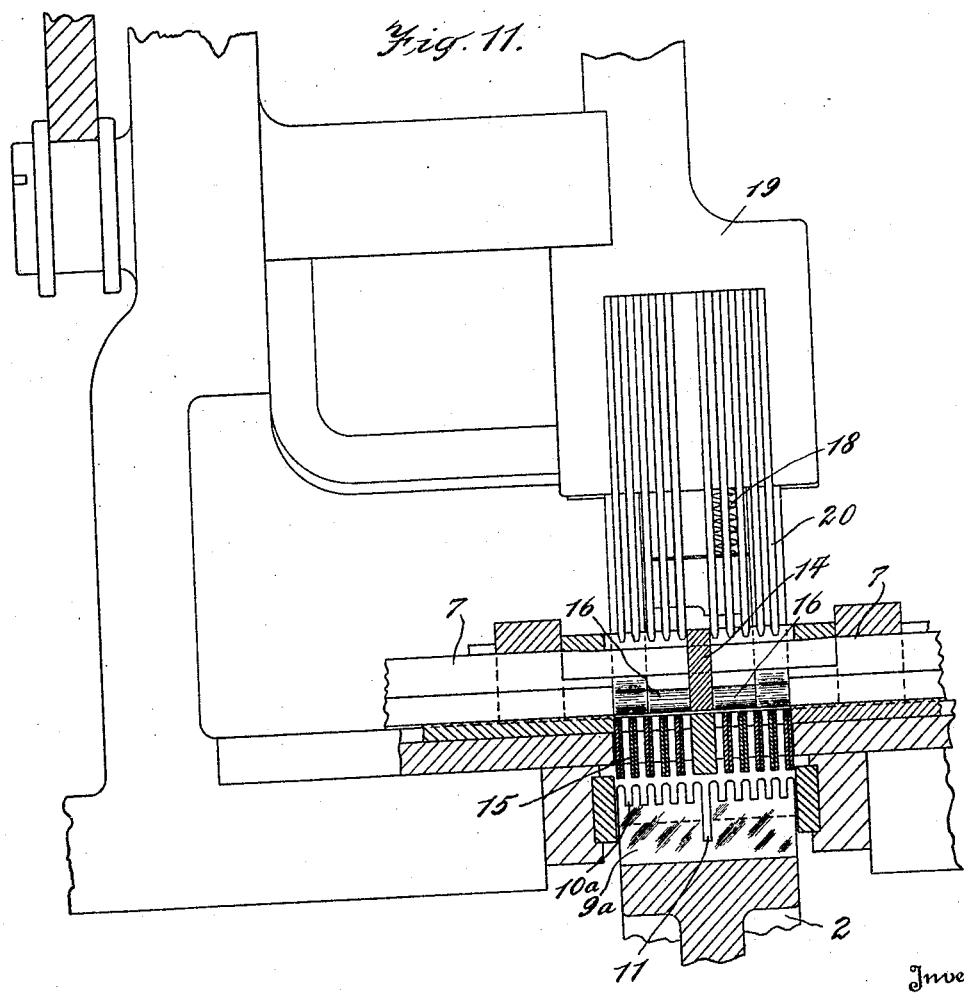

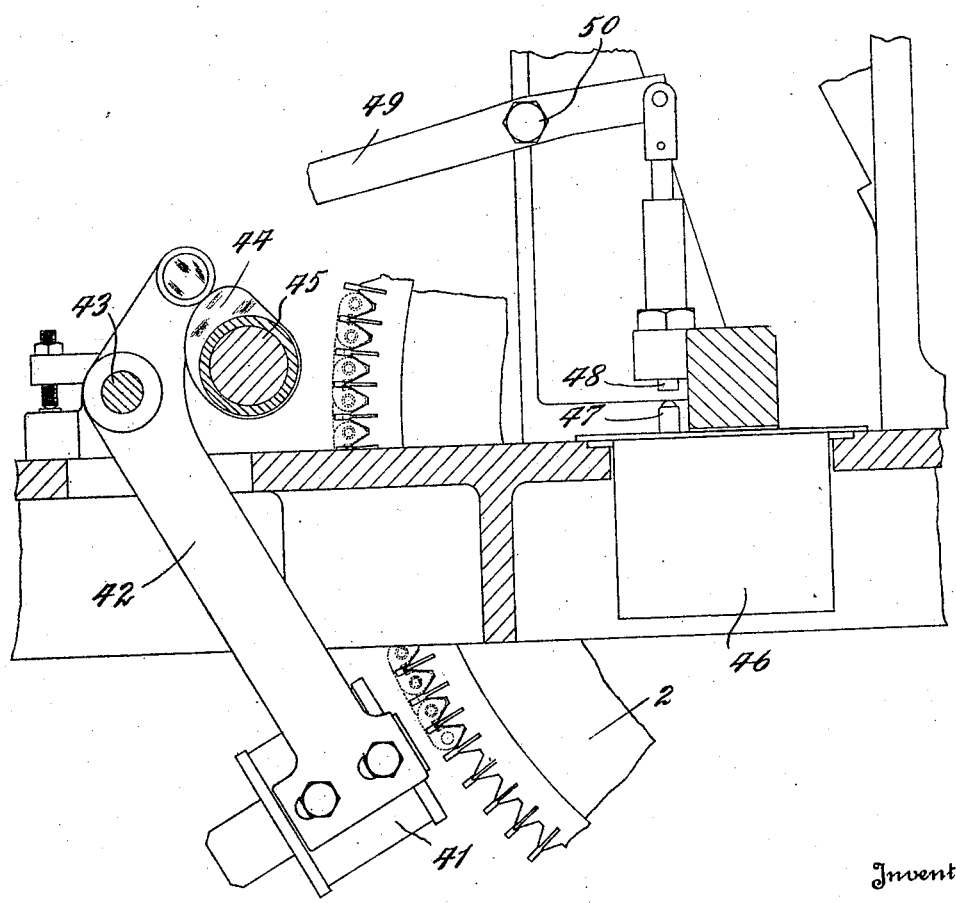

March 7, 1933. F. MÜLLER 1,899,976
AUTOMATIC CHAIN ASSEMBLING MEANS
Filed Aug. 1, 1929  11 Sheets-Sheet 10
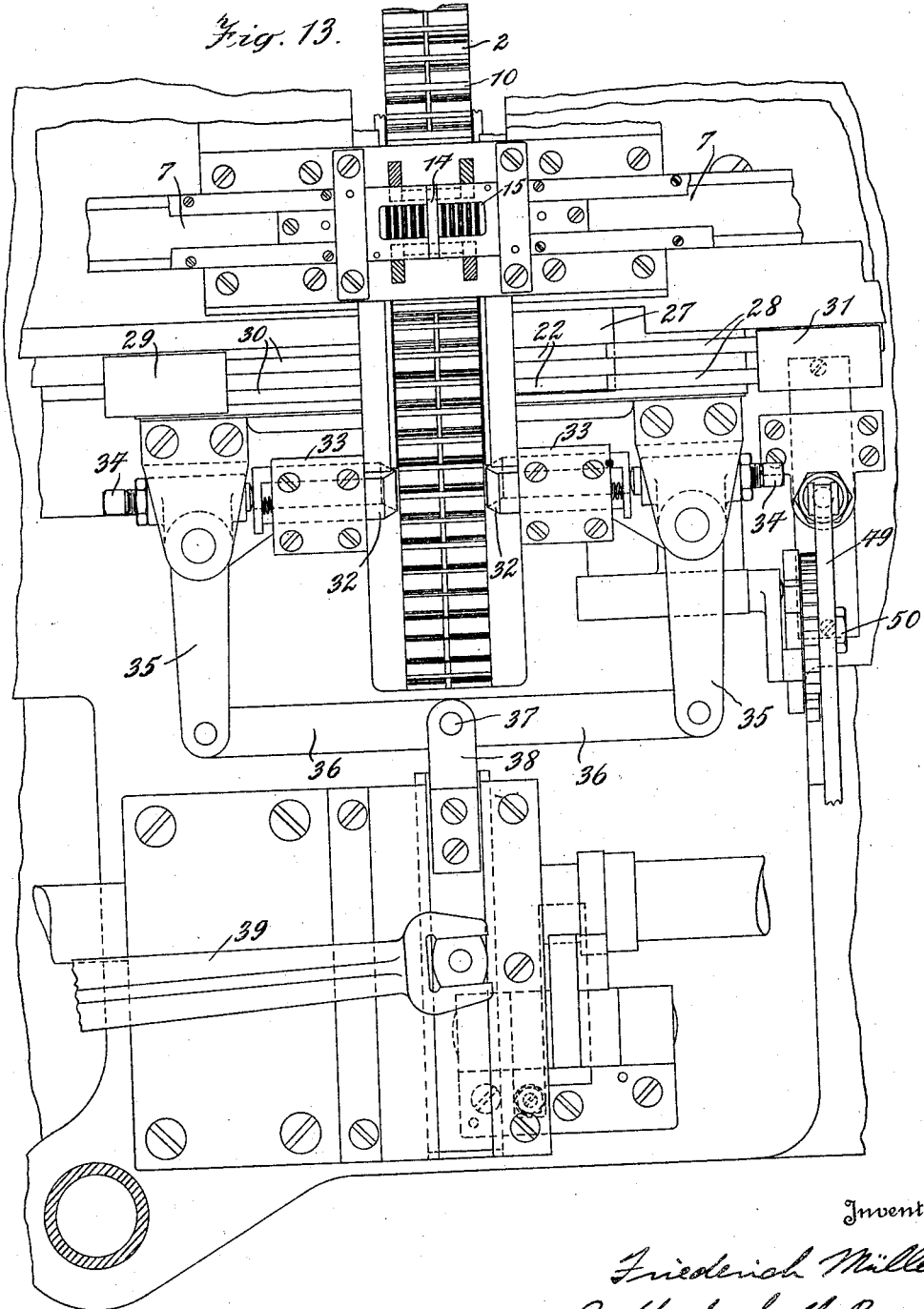

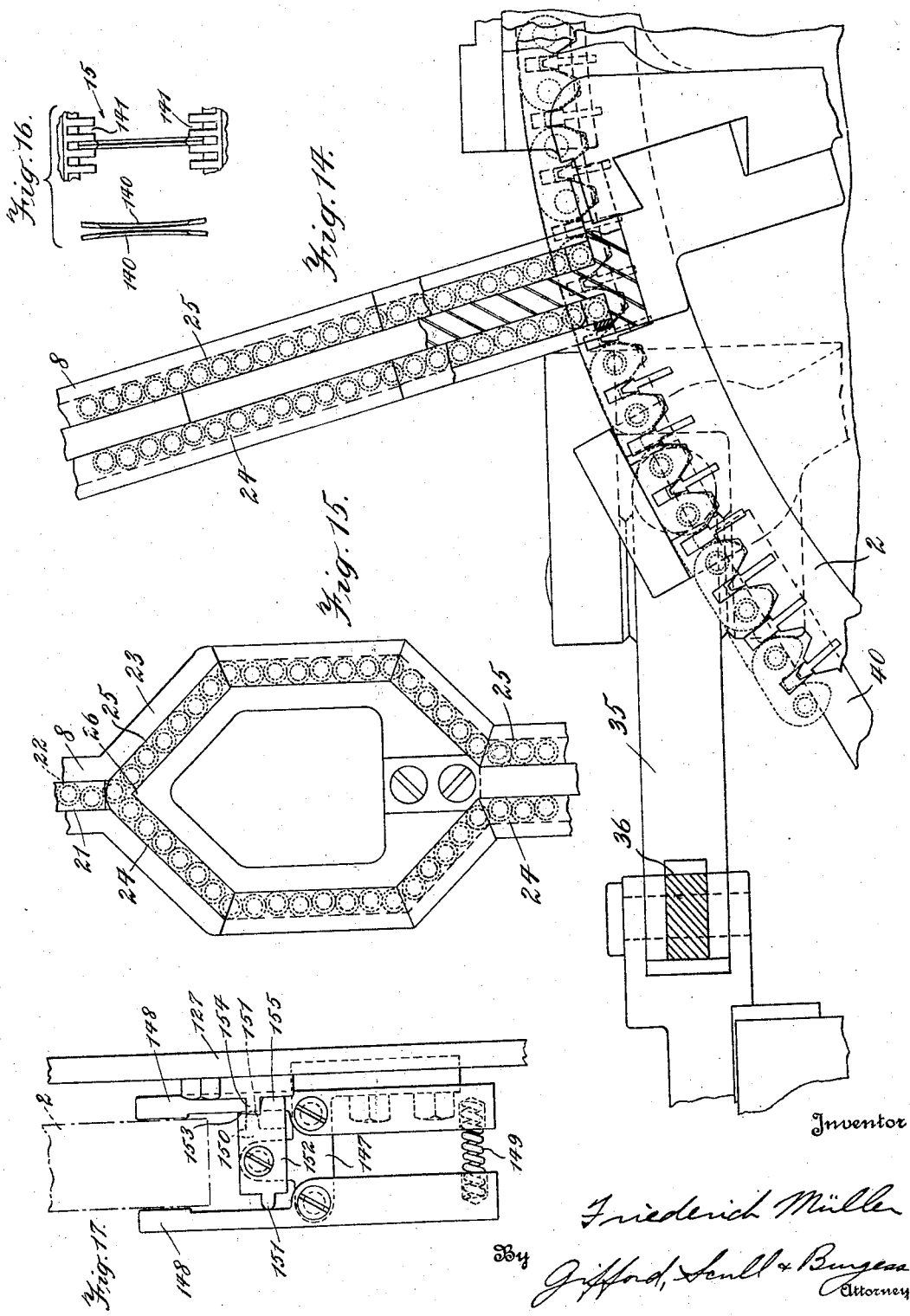

Patented Mar. 7, 1933

1,899,976

UNITED STATES PATENT OFFICE

FRIEDERICH MÜLLER, OF ELIZABETH, NEW JERSEY, ASSIGNOR TO THE WHITNEY MFG. CO., OF HARTFORD, CONNECTICUT, A CORPORATION OF CONNECTICUT

AUTOMATIC CHAIN ASSEMBLING MEANS

Application filed August 1, 1929. Serial No. 382,748.

This invention relates to a novel and improved form of machine for automatically assembling the elements which go to make up a chain, more particularly the type of chain known as the silent link type. The novel features of the invention will be best understood from the following description and the annexed drawings, in which I have shown a selected embodiment of the invention and in which:—

Fig. 2 is a rear elevation.

Fig. 3 is an elevation from the right of Fig. 1.

Fig. 4 is an elevation from the left of Fig. 1.

Fig. 5 is a section taken approximately on the line 5—5 of Fig. 1.

Fig. 6 is an elevation on an enlarged scale with parts broken away, showing a view of the assembling member.

Fig. 7 is a horizontal section through the assembling member and through the driving and re-setting mechanism therefor.

Figs. 8 and 9 show perspective views of individual elements which may be employed on the assembling member appearing in Figs. 6 and 7.

Fig. 10 is a fragmentary elevation, parts being shown in section, of a portion of the assembling member and parts associated therewith during the assembling operation.

Fig. 11 is a view on approximately the line 11—11 of Fig. 10.

Fig. 12 is an enlarged sectional view showing means for stripping the chain from the assembling member.

Fig. 13 is an enlarged plan view showing the assembling member and the means for staking the rivets.

Fig. 14 is a fragmentary view on an enlarged scale, showing the manner in which the rivets are supplied to the assembling member.

Fig. 15 is a fragmentary view on an enlarged scale showing the means for dividing the rivets into two streams flowing to the assembling member.

Fig. 16 is a view showing the details of the manner in which the grid is formed.

Fig. 17 is a view showing the operation of the automatic brake.

Figure 1:
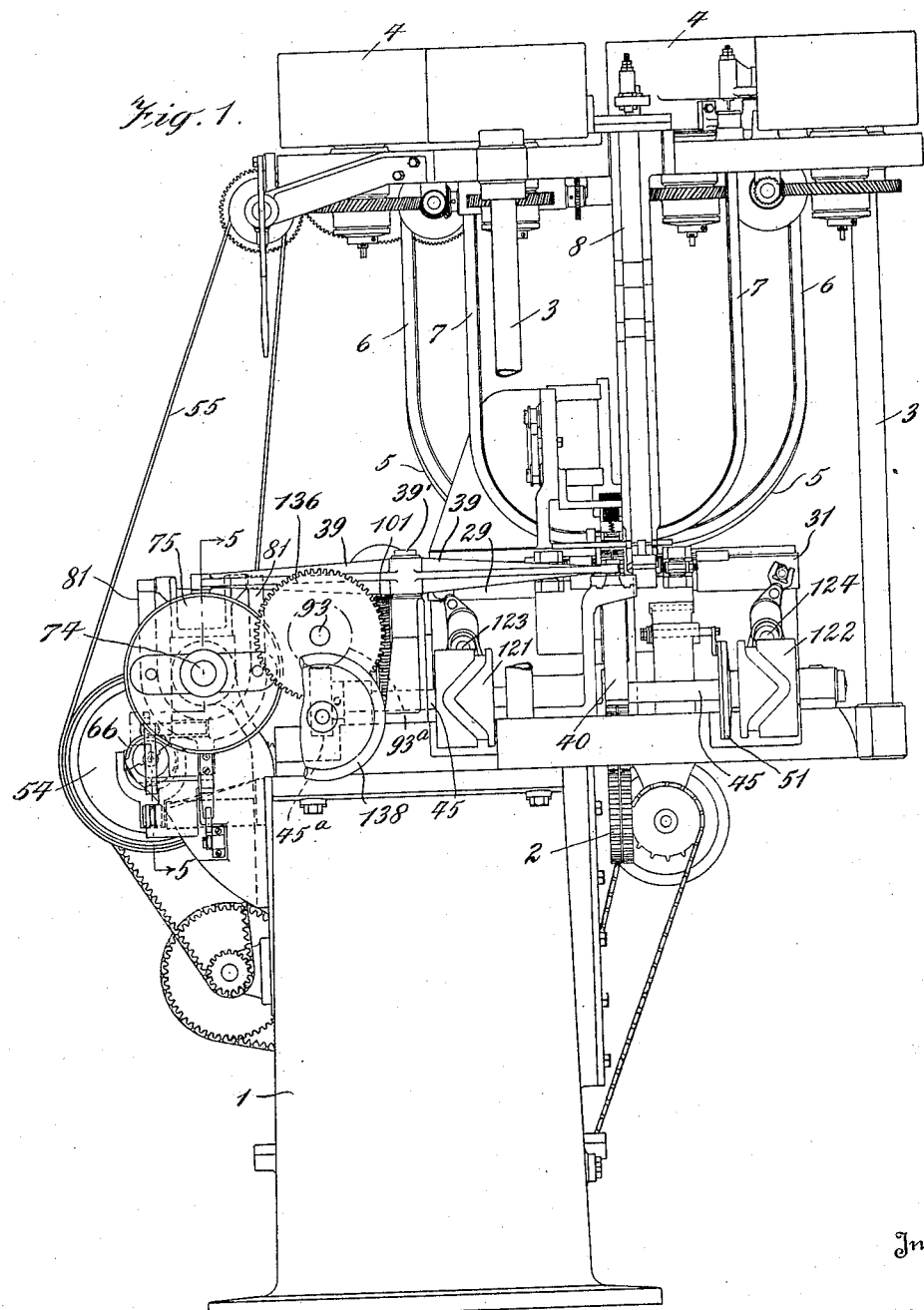
Fig. 1 is a front elevation of the machine.

Referring first to Figs. 1, 2, 3 and 4, it will be seen that the machine is mounted on a suitable base 1 which supports the assembling member 2 and which carries vertically extending posts 3 upon which are supported a plurality of hoppers 4, these hoppers containing the elements which are to be assembled into a chain. These elements are fed to chutes which conduct them to the assembling member. The means for feeding the elements to the chutes may be of any suitable form and will not be further described in this application. The elements referred to are the links, guides and rivets which go to make up the chain, and in the illustrated embodiment, the guides are fed to the assembling member through a chute 5 and the links through chutes 6 and 7. One of these chutes 6 or 7 may be used for feeding the links to make a so-called even pitch, and the other chute for feeding the links to make the so-called odd pitch of the chain. The rivets are fed through a chute 8 which will be described more in detail later.

The assembling member is in the form of a locating wheel, as plainly shown in Fig. 3, and the various chutes 5, 6 and 7 deliver elements to a point above this wheel, as best shown in Figs. 10 and 11. Referring to those figures, there is shown therein the upper portion of the wheel which forms the assembling member 2, and this member is provided with locating teeth in the form of elements 9, each of which has a slot 10, as shown in Figs. 10 and 13. Separator elements 9a, 9b, are mounted in the slots 10, these elements having bearing surfaces 9' engaging the walls of the slot. When the separator elements are thus mounted in the slots 10 of the teeth, they form an operative part of the teeth, so that the teeth serve to locate the chain elements or links along the periphery of the assembling member and also parallel to the axis of the same member. That is to say, the teeth on the assembling member locate the links or other elements of the chain in correct position, both lengthwise of the chain which is being formed and transversely thereof.

Each element 9a, 9b, is provided with circumferentially extending grooves or recesses 10a, which are adapted to receive links which are deposited therein in a manner to be presently described, and the element 9 may also contain a groove 11 to receive a guide which is to form part of the finished chain.

The lower ends of the chutes 5, 6 and 7 are shown in Fig. 10, and in dotted lines in those chutes are indicated the various elements which are fed to the assembling member through those chutes. The chute 5, as noted above, is used in this embodiment to provide guides 12, while the chutes 6 and 7 provide links 13. It will be noted that there is one chute 5, two chutes 6, and two chutes 7, one on either side of the assembling member, so that the link elements may be fed to the assembling member from either side thereof. The lower ends of these chutes are horizontally disposed, as plainly shown in Figs. 10 and 11, and the link elements discharged therefrom come to rest against a stop 14 disposed centrally over the assembling member and above a grid 15. This grid has a plurality of longitudinally extending bars constructed in a manner to be described more in detail presently, and these bars are spaced apart a proper distance to permit a chain element to be forced therebetween.

The elements 13 are preferably held suspended in position above the assembly member and above the grid by spring-pressed fingers 16 onto which the elements are discharged, these fingers being shown as mounted on arms 17 which are urged into normal position by compression springs 18. Of course, any other suitable spring-pressed arrangement may be utilized for this purpose. I have omitted any showing of fingers 16 to support the element 12. In the machine from which the drawings are made, the guide 12 is disposed at the center of a pitch of links, with only one guide to a pitch. This means that there is required only one opening in the grid to discharge the guides into position on the assembling member. Therefore, it will be obvious that a line or stack of elements 12 will be pushed up against a stop 14, and immediately in front of that stop is the single opening of the grid. The pressure of the stack will normally be sufficient to hold the single element at the end of the stack against the stop until displaced, as described later. Of course, it is to be understood that if more guides are used, it is found desirable to employ fingers 16 in connection therewith, and such fingers may be used in this location.

It is to be understood that there is a suitable grid or equivalent guide adapted to guide the various elements into position on the assembling member, the spaces between the grid bars being directly above the grooves 10a in the elements 9a, 9b on the assembling member.

Slidably mounted above the positions occupied by the elements when discharged from the chutes is a reciprocating transfer slide 19 there being one of these slides provided for the purpose of transferring elements from the bottom of each chute to the assembling member. As indicated in Fig. 11, this slide has at its lower end a plurality of transfers 20 disposed directly above the spaces between grid bars, and these transfers are adapted to engage the chain elements and force them downwardly past the restraining fingers 16 through the spaces between the grid bars and onto the assembling member, the elements being received in the proper grooves on that member. Certain chain elements will be in position above the openings in the grid, and others will be resting on top of the grid bars. When the transfer slide is depressed, it will force through the spaces between the grid bars those elements which are over those spaces, and then when it is raised, the fingers 16 will engage those elements which have not been transferred to the wheel and will lift them into correct upright position, where they will be put close together by the additional elements coming from the chutes.

After the link elements have been placed in position on the assembling member, this member is then moved forwardly, by means to be described later, and into position where the rivets may be inserted.

Referring particularly to Figs. 13, 14 and 15, I have shown therein the chute 8 having at its upper portion a single path 21 through which the rivets 22 pass downwardly from the hopper in which they are stored, it being noted that the single path 21 is wider than the outside diameter of a rivet, but less than twice such outside diameter. Intermediate its length the chute is provided with an enlargement 23 containing two paths 24 and 25 providing between them a sharp nose 26 adapted to divert the rivets some into one path and some into the other. The rivets will pass first to one path and then to the other, it being noted that, as a rivet enters the path 24, for example, the next rivet will be diverted towards the other path 25 by striking the rivet in the path 24. The next rivet above will be diverted towards the side of the path 21 adjacent the path 24, this being permitted by the additional width of the path 21. The two paths 24 and 25 are brought closer together, as plainly shown at the bottom of Fig. 15, so that they then follow two paths spaced apart a distance equal to the distance between the holes which they are designed to enter in the chain.

The rivets are thus deposited in pairs in line with the holes which they are designed to enter, the position of the bottom of the chute 8 being indicated at 27 in Fig. 13. This position is such that the rivets are deposited in line with the transfers 28, these transfers being in the form of pins so located and spaced as to register with two adjacent holes through a chain on the assembling member. On the opposite side of the assembling member is provided a slide 29 having a pair of pilot pins 30 spaced exactly opposite the transfers 28.

By suitable mechanism to be described later, after the assembling member has been moved to bring one or more pitches of chain in proper relation to the transfers 28 and pilot pins 30, the slide 29 is operated to pass the pilot pins 30 through the holes in the various links forming the chain, thus lining up these holes. The slide has a reciprocating movement, and as it starts its backward travel to the position shown in Fig. 13, the transfers 28 start movement towards the left. In this movement their ends engage the ends of rivets 22 and force the other ends of these rivets against the ends of the pilot pins 30. The rivets are thus carried between the transfers and the pilot pins through their proper holes in the several links, and/or other elements which they are to unite. The transfers 28 are secured to a slide 31 which is also reciprocated by suitable mechanism which will be described later. After the rivets are in place in the chain, the transfers will be withdrawn by movement of the slide 31.

The assembling member is next given another intermittent forward movement to bring another part thereof into position to receive other elements of the chain, to bring other elements which are already on the member into registry with the pilot pins and rivet transfers, and to bring the ends of the rivets which have already been inserted by the operation previously described, into registry with stakers 32. These members are shown as having cutting edges disposed on opposite sides of the assembling member and adapted to contact with the opposite ends of two adjacent rivets in the chain. These stakers are slidably mounted in guides 33 and are engaged on their ends by adjustable pins 34 here shown as screws, threaded in the ends of levers 35 pivoted at their other ends to toggle arms 36, these arms being jointed together at 37, and this joint being connected to a slide 38. This slide is reciprocated by means of a lever 39 which in turn is operated by means which will be more fully described later. The stakers merely cut the ends of the rivets and spread the cut ends sufficiently to prevent displacement of the rivets from the chain. The rivets can, if desired, be headed by suitable mechanism in the machine in place of the stakers, but I find it more desirable from an operating standpoint to merely stake the rivets and then to perform the riveting operation to form heads on the rivets on separate machines.

After leaving the stakers, the chain, which is now finished so far as operation of this machine is concerned, may be stripped from the assembling member by means of a guide 40, as best shown in Figs. 1, 3 and 14. In place of the mechanical stripping means just described above, there may be and preferably is employed a magnetic means for removing the chain from the assembling member. This is best shown in Fig. 12, where there is indicated a magnet 41 disposed close to the periphery of the assembling member and supported on an arm 42 pivoted at 43 and adapted to be rocked towards and away from the assembling member as by a cam 44 mounted on a shaft 45. This shaft is rotated by means to be described later. The magnet is intermittently energized by closing of a switch, here shown as being received in a box 46, the switch being operated by a plunger 47 which is intermittently depressed by a reciprocating rod 48, this rod being given this movement by means of a lever 49 pivoted at 50 and adapted to be operated by means of a cam 51 disposed on the shaft 45, as indicated in Fig. 1.

Referring to Figs. 8 and 9, I have shown therein two examples of different kinds of elements which may be mounted on the assembling member. Of course it is to be understood that these elements will vary according to the kind of chain which is being assembled but, for the purposes of illustration, I have shown two of the elements 9a, 9b one in each of Figs. 8 and 9, that shown in Fig. 8 being of the form used to assemble the links forming the so-called even pitch of the chain, and that shown in Fig. 9 being of the kind used to assemble links forming the so-called odd pitch of a chain. In either case the element comprises a plurality of grooves 10a as previously described, and in Fig. 9 is shown an additional groove 11 to receive a guide.

I will now describe the operating mechanism for the various parts previously described. Mounted on the base 1 is a motor 52 driving through suitable connections a shaft 53. These driving connections are best shown in Fig. 2, but will not be described in detail. On the shaft 53 is a pulley 54 driving a belt 55 which operates the mechanism for guiding and delivering the various chain elements to the different chutes. The shaft 53, as best shown in Fig. 5, is driven by a gear 56, this gear being mounted on a sleeve 57 which is keyed to the shaft and which carries a drum 58 forming one element of a friction clutch. The gear 56 is secured to the element 58 by means of a shear pin 59 which is adapted to break when undue load is placed upon the machine, so as to stop operation of the machine before excessive damage is done.

The element 58 is shown as having a circumferential flange 60 within which is received a disc 61 having a friction face contacting with a cooperating face on the flange, the disc 61 thus forming the other element of the friction clutch.

The disc 61 is integral with a sleeve 62 surrounding the shaft 53 and rotatable thereon. Mounted within bores in the sleeve is a plurality of axially extending rods 63 supporting thrust bearing ring 69 to hold one side of the thrust bearing. Clutch teeth 64 on the sleeve 62 are adapted to cooperate with corresponding clutch teeth 65 on a member 66 slidably mounted on but keyed to a shaft 67 having one end bearing in a bore in the shaft 53. Clutch teeth 64 and 65 are in mesh at all times and the teeth 65 have two lengths, the longer teeth being engaged in teeth 64 for a starting or friction drive through the elements 58 and 61 and the short teeth making the positive drive when engaged with teeth on member 64' secured to end of shaft 53. Spring members 62a, mounted in sleeve 62, transmit pressure from the sliding member 66 to the friction disc 61 to move it into engagement with member 58 to establish a friction drive. Thus, as the member 66 is slid to the left in Fig. 5, such movement establishes first a friction drive and then a positive drive. The member 66 is in the form of the usual grooved clutch collar, and may be actuated towards and away from the teeth 64 by means of the lever 70.

The shaft 67 has keyed thereon a pinion 71 driving a gear 72 keyed to a sleeve 73 rotatably mounted on a shaft 74. The sleeve has keyed thereto a cam drum 75 and slidably mounted in this drum is a locking plunger 76 keyed to the bushing 77 fast in the drum, as plainly shown in Fig. 5. This plunger is urged towards the right of Fig. 5 by means of the spring 78, and the right-hand end thereof, which is shown as pointed, is received within a hole 79 in a driving member 80 keyed to the shaft 74. By this arrangement the motor drives the shaft 74 through the various connections described above, but when an overload is put on the machine, the beveled end of the plunger 76 is forced out of the hole 79, thereby breaking the driving connection. When this happens, the left-hand end of the plunger contacts with an actuator 81 which is here shown as a yoke pivoted at 82 on the machine frame. This yoke will be engaged by the plunger and forced to the left, as viewed in Fig. 5.

The lower end of the yoke 81 is provided with a tooth 83 riding on a cam 84 attached to a latch 85, so that when the above described action takes place, this latch 85 will be released from engagement with the bearing member 86 which is pivoted at 87 on the machine frame and is lightly urged in a clockwise direction on that pivot by means of a spring 88. The bearing member 86 urges towards the left of Fig. 5 a rod 89 pinned to the collar 66 at 89', and thus when the bearing member 86 is in the position shown in Fig. 5, the collar 66 is urged towards the left so as to bring the teeth 64' and the short teeth 65 into engagement, and so as to engage the positive clutch formed by the elements 64' and the short teeth 65. When the bearing 86 is released by movement of the latch 85 the springs 68 will force the element 61 out of engagement with the element 60, thus breaking the driving connection at that point, after the spring members 62a have disconnected the positive drive by separating the teeth on 64 from the short teeth 65.

Keyed to the shaft 74 is a pinion 90 meshing with a pinion 91, which in turn drives the pinion 92 on the shaft 93. Fast on the shaft 93 is a gear 94 meshing with a pinion 95 on the shaft 96. This shaft carries one element 97 of a friction clutch, the other element 98 of which is mounted on a shaft 99 in alignment with the shaft 96. This shaft 99 carries a worm 100 meshing with a worm gear 101 on a shaft 102, to which is keyed the assembling member 2. By this means continuous rotation is normally given to the shaft 96 to drive the shaft 99, but this continuous rotation is transformed into intermittent rotation of the shaft 99 by means of a locking pin 103 best shown in Fig. 2, and which is adapted to engage in a recess in a locking plate 96' pinned to the shaft 96. This locking pin is urged towards the shaft by means of a suitable spring 104 and is intermittently moved out of engagement with the shaft by a bell-crank lever 105 operated by a cam 106 on the shaft 93. By this arrangement the shaft 102, and consequently the assembling member 2, are given intermittent movement to index the chain elements carried thereby, it being understood that, when the plate 96' is locked by the pin 103, the motion of the shaft 96 is arrested, the clutch 97—98 slipping until the plate 96' is again released.

Secured to the shaft 93 is a cam 107 having a groove in which rides a roller 108 on an arm 109 secured to a rock shaft 110. Secured to the shaft is a segmental gear 111, best shown in Fig. 3, which engages with another segmental gear 112 secured to a rock shaft 113. On this shaft is still a third segmental gear 114 meshing with a rack 115, shown also in Fig. 4, and which is provided with a plurality of cam slots 116, each receiving therein a roller 117 on a pin extending through the guide plate 118 and secured to the transverse slides 19 on the other side of the guide plate. By this means the rack 115 is reciprocated, and its reciprocation in turn causes a vertical reciprocation of the slides 19.

The cam drum 75 has a groove 119 in which rides a roller 120 pivoted to one end of a lever 39 pivoted at 39', and the other end of which operates the toggle consisting of the arms 36. The shaft 45 is driven by the spiral gears 45a and 93a (Fig. 1), and this shaft carries two cams 121 and 122. The cam 121 is adapted to operate a rock shaft 123 to reciprocate the slide 29 while the cam 122 is adapted to operate a rock shaft 124 to reciprocate the slide 31, as best shown in Fig. 1, the cams being arranged to give the sequence of operations previously described.

At times, it may be desirable to displace the assembling member 2 so as to do work thereon such as replacing elements 9, and to facilitate this operation I preferably mount the bearing 125 for the shaft 102 in a vertically movable carriage 126 mounted between guideways 127, as best shown in Fig. 3. The carriage 126 has threaded engagement with a screw 128 which is driven through bevel gearing 129 from a shaft 130, which in turn may be driven by movement of a hand-wheel 131 connected to the shaft by a chain 132 running over suitable sprockets connected to the hand-wheel and to the shaft respectively. The carriage 126 is located in normal position by a slidable bolt engaging in the cavity 126a, (Fig. 6). When the carriage is lowered and then raised to operative position, it is essential that the teeth on the assembling member should occupy correct position with respect to the transfer slides 19 and, therefore, I fix on the bearing 125 a standard 133 having pivoted thereon a pawl 134 adapted to cooperate with the teeth of a ratchet-wheel 135 fixed to the shaft 102. By this arrangement, the assembling member may also be re-centered with respect to the other operating parts. The pawl 134 is placed in engagement with one of the teeth on the wheel 135 to serve as a locating arrangement. This arrangement absolutely prevents rotation of the shaft 102 in one direction, and serves as an indicator for use in placing the parts back in correct position if they become accidentally displaced. The tooth on the wheel 135 should be forced into tight engagement with the pawl 134 before again raising the carriage.

In case it is desired to impart movement to the assembling member after the driving connection is broken, I provide on the shaft 93 a gear 136 meshing with a pinion 137 on a stub shaft on which is also secured a hand-wheel 138. This arrangement permits a certain amount of manual actuation of the operating parts independently of the motor drive, which is particularly useful when the motor drive is broken, because of an undue load thereon. If desired, the motor drive may also be broken manually by actuation of an operating lever 139 which, as plainly shown in Figs. 4 and 5, will cause the latch 85 to release the bearing member 86.

In Fig. 16, I have shown a form of grid which has been found to be particularly efficient, and referring thereto, it will be seen that each bar consists of two bow springs 140 placed with their convex parts together and then inserted in grooves 141 in the grid plate. These grooves are of a size to closely fit the ends of the springs and to straighten them out, as plainly shown in Fig. 16. By this arrangement the bars are resiliently held in position without any special fastening means.

Referring now to Figs. 3, 4 and 5, I have shown therein means for automatically tripping the operating mechanism upon failure of the chain to leave the assembling member 2. Mounted on the carriage 126 is a trip 142 disposed in position to be engaged by any chain which may adhere to the assembling member. Pivoted to this trip is a link 143, which slides in angle 143a secured to carriage 126. Trip 142 is returned to its normal position against stop pin 142a by spring 142b connected to the angle 143a and the trip 142. With the trip rod in normal position, a pin 144 thereon is received within a fork on an arm 145 which is secured to a rock shaft 146, to the other end of which is pivoted the lever 139, appearing in Figs. 4 and 5. By this arrangement, it will be obvious that upon engagement of the trip 142 by the chain, the shaft 146 will be rocked and the latch 85 released to permit the bearing member 86 to move to the right, as viewed in Fig. 5, thus breaking the driving connection.

In order to prevent relative motion between the assembling member and other operating parts, when the carriage 126 is lowered, I provide a brake, best shown in Figs. 3 and 17, which will engage the member 2 as soon as the carriage is lowered slightly. Mounted on the carriage is a bracket 147 on which are pivoted brake members 148 adapted to engage opposite sides of the member 2, and normally urged towards engaging position by means of a compression spring 149. Pivoted on the bracket is a separator 150 having oppositely disposed noses 151, each of which is adapted to engage one of the brake members 148 and hold these members out of contact with the member 2, against the action of the spring 149.

Secured to the separator and, for the sake of simplicity shown as integral therewith, is a trip 152 having an inclined face 153 adapted to engage a correspondingly inclined surface on a stop 154 secured to one of the guides 127. The arrangement is such that when the parts are in the position shown in Fig. 17, the stop 154 will hold the noses 151 against the members 148, and thus the member 2 is free to rotate. The stop is in engagement with the inclined surface 153. Now, particularly upon lowering of the carriage with the member 2 thereon, the stop, because of its engagement with the inclined surface 153, will cause rotation of the trip with the separator in a counter-clockwise direction, as viewed in this figure. This rotation of the separator will immediately release the members 148 and they will clamp the member 2 and hold it against accidental rotation. As the carriage is again raised to the position shown in Fig. 17, the stop 154 will engage the projection 155 on the trip and cause return of the trip and the separator to the position shown in Fig. 17, thus releasing the member 2 from the action of the brake.

While the invention will be readily understood from the above description, the operation thereof may be briefly summarized as follows:

The locating wheel which forms an assembling member is given its intermittent rotation and the chain elements are fed through the various chutes to positions above the wheel periphery, where they are transferred to the locating teeth on the wheel. The chutes operating in conjunction with the teeth on the wheel and the grids above the wheel, serve to locate the elements positively both lengthwise and sidewise of the chain which is being made. As the wheel is intermittently rotated after a pitch of elements is assembled thereon, the elements are still more positively located by means of the pilot pins and, finally, by rivets themselves. In case it is necessary to reach the chain elements on the wheel for any purpose, this may be done by lowering the carriage on which the wheel is mounted and when the wheel is again lifted to operative position, the pawl and ratchet arrangement will insure that the parts are in correct position to resume operation.

While I have shown a selected embodiment of the invention, I am of course aware that various changes in details will be apparent to those skilled in the art and can be made without departing from the scope of my invention, which is defined in the appended claims.

I claim:—

1. In a chain assembling machine, an assembling member, means for feeding chain elements forming successive pitches to said member in overlapping relation to each other, means on the member for receiving said elements in said overlapping relation to each other to form a chain, and means for intermittently moving said member in one direction to bring successive parts thereof into position to receive other chain elements.

2. In a chain assembling machine, an assembling member, means for feeding links forming successive pitches to said member in overlapping relation to each other, means on the member for receiving said links in said overlapping relation to each other to form a chain, means for securing said links together, and means for intermittently moving said member in one direction to bring successive parts thereof into position to receive other links.

3. In a chain assembling machine, a rotary assembling member having locating teeth on its periphery, means to intermittently rotate said member to bring successive teeth into a predetermined position, means to supply chain elements to said position, and means acting radially of said member and causing said elements to engage said teeth.

4. In a chain assembling machine, a rotary assembling member having locating teeth on its periphery, said teeth having circumferentially extending grooves adapted to receive links of the chain, means to intermittently rotate said member to bring successive teeth into a predetermined position, means to supply chain elements to said position, and means causing said elements to engage said teeth.

5. In a chain assembling machine, an assembling member comprising a rotatable wheel having teeth thereon, means for feeding chain elements to position adjacent said wheel, means for intermittently rotating said wheel, means for bringing successive pitches of teeth in wheel to bring successive pitches of teeth into position to receive elements thereon, and means for transferring said elements from said position to the teeth.

6. In a chain assembling machine, an assembling member comprising a rotatable locating wheel having teeth thereon, means for feeding chain elements to position adjacent said wheel, means for intermittently rotating said wheel to bring successive pitches of teeth into position to receive elements thereon, means for transferring said elements from said position to the locating teeth, means for bodily moving said wheel away from assembling position, and means for returning said wheel to said position with the teeth thereon in correct relation with respect thereto.

7. In a chain assembling machine, a chain assembling member comprising a rotatable locating wheel having teeth thereon, means for bringing a group of teeth on said wheel into assembling position, means to supply chain elements to position adjacent the wheel at said assembling position, means releasably holding said elements at said position, and means to transfer the elements from said position to the wheel.

8. In a chain assembling machine, a chain assembling member comprising a rotatable locating wheel having teeth thereon, a plate disposed adjacent the periphery of said wheel and normal to its diameter, said plate having an opening registering with the edge of the wheel, the teeth on said periphery having a plurality of circumferentially extending grooves adapted to receive chain elements, a grid closing the opening in said plate with the openings in the grid registering with said grooves, means to releasably hold a pitch of chain elements adjacent said grid, and means to transfer said elements through the openings in the grid into the grooves in said teeth.

9. In a chain assembling machine, a chain assembling member comprising a rotatable locating wheel having teeth thereon mounted on a substantially horizontal axis, a horizontal plate disposed above the periphery of said wheel and having an opening therein registering with the edge of the wheel, the teeth on said periphery having a plurality of circumferentially extending grooves adapted to receive chain elements, a grid closing the opening in said plate with the openings in the grid registering with said grooves, means to releasably hold a pitch of chain elements above said grid, and means to transfer said elements through the openings in the grid into the grooves in said teeth.

10. In a chain assembling machine, a chain assembling member comprising a rotatable locating wheel having teeth thereon mounted on a substantially horizontal axis, a horizontal plate disposed above the periphery of said wheel and having an opening therein registering with the edge of the wheel, the teeth on said periphery having a plurality of circumferentially extending grooves adapted to receive chain elements, a grid closing the opening in said plate with the openings in the grid registering with said grooves, chutes terminating on opposite sides of said wheel and adapted to discharge a pitch of chain elements above said grid, and means to transfer said elements through the openings in the grid into the grooves in said teeth.

11. In a chain assembling machine, a chain assembling member comprising a rotatable locating wheel having teeth thereon mounted on a substantially horizontal axis, a horizontal plate disposed above the periphery of said wheel and having an opening therein registering with the edge of the wheel, the teeth on said periphery having a plurality of circumferentially extending grooves adapted to receive chain elements, a grid closing the opening in said plate with the openings in the grid registering with said grooves, chutes teminating on opposite sides of said wheel and adapted to discharge a pitch of chain elements above said grid, a vertically movable transfer slide having fingers registering with the grid openings, and means for forcing said slide downwardly to transfer said elements through the grid openings into the grooves in said teeth.

12. In a chain assembling machine, a grid through which chain elements are adapted to be transferred onto an assembling member, said grid being composed of a plurality of bars, each bar consisting of two bow springs disposed with their convex faces in contact, and a plate having grooves receiving the ends of said springs and so arranged as to flatten said bows when their ends are disposed therein.

13. In a chain assembling machine, a chain assembling member having a plurality of locating teeth of approximately the same pitch as that of the finished chain, each tooth being adapted to hold a plurality of chain elements forming a pitch of the chain, means for holding the elements of said pitch adjacent said teeth, and means for transferring a pitch of elements to the teeth.

14. In a chain assembling machine, a chain assembling member having a plurality of locating teeth of approximately the same pitch as that of the finished chain, each tooth being adapted to hold a plurality of elements forming a pitch of the chain, means for assembling a plurality of pitches at spaced intervals adjacent said teeth, and a plurality of transfer slides adapted to transfer said elements to position on different teeth.

15. In a chain assembling machine, a chain assembling member having a plurality of locating teeth of approximately the same pitch as that of the finished chain, each tooth being adapted to hold a plurality of elements forming a pitch of the chain, means for assembling a plurality of pitches at spaced intervals adjacent said teeth, a plurality of transfer slides adapted to transfer said elements to position on different teeth, and means for securing together successive pitches on the assembling member.

16. In a chain assembling machine, a chain assembling member having a plurality of locating teeth of approximately the same pitch as that of the finished chain, means for holding a pitch of chain elements adjacent said member at each of said positions, and a plurality of transfer slides one at each of said positions and each consisting of a plurality of fingers, each finger adapted to engage one of said elements, and means for operating said slides in unison to transfer the pitches of elements to the member.

17. In a chain assembling machine, a chain assembling member having a plurality of locating teeth of approximately the same pitch as that of the finished chain, means for holding a pitch of chain elements adjacent said member at each of said positions, a plurality of transfer slides one at each of said positions and each adapted to transfer a pitch of elements to said member, and means for operating said slides in unison.

18. In a chain assembling machine, a chain assembling member having a plurality of locating teeth of approximately the same pitch as that of the finished chain, means for holding a pitch of chain elements adjacent said member at each of said positions, a plurality of transfer slides one at each of said positions and each adapted to transfer a pitch of elements to said member, means for operating said slides in unison, and means for securing together successive pitches on the assembling member.

19. In a chain assembling machine, a rotatable locating wheel having teeth thereon, each tooth being adapted to receive a plurality of chain elements forming a pitch, a transfer slide adapted to move towards and away from said wheel to transfer elements thereto, said slide comprising a plurality of transfers each adapted to engage one of said elements, and means releasably holding a pitch of elements between the ends of said transfers and said wheel, and means to operate said slide.

20. In a chain assembling machine, a rotatable locating wheel having teeth thereon, each tooth being provided with grooves adapted to receive a plurality of chain elements forming a pitch, a transfer slide adapted to move towards and away from said wheel to transfer elements thereto, said slide comprising a plurality of transfers each adapted to engage one of said elements, means releasably holding a pitch of elements between the ends of said transfers and said wheel, and means to operate said slide to transfer said elements to said grooves.

21. In a chain assembling machine, a locating wheel mounted on a substantially horizontal axis and having teeth on its periphery adapted to receive chain elements, a hopper containing chain elements and mounted above said wheel, a chute from said hopper leading downwardly towards the wheel and discharging elements in a horizontal position adjacent the upper edge of the wheel, means to releasably hold a pitch of elements above the wheel, and a transfer slide adapted to push said pitch onto the wheel.

22. In a chain assembling machine, a movable assembling member having locating teeth thereon, means to assemble a plurality of pitches of chain elements on said teeth with the elements in adjacent pitches overlapping each other, means to move said member with said pitches thereon to a different position, a pilot pin at said position on one side of said member adapted to pass through approximately aligned openings in said elements, means to feed a rivet to the side of said member opposite said pin, means to force said rivet into engagement with the ends of said pin, means to force said rivet through said openings, means to move said member to a third position, and means at said third position to enlarge the end of said rivet to prevent removal thereof.

23. In a chain assembling machine, a movable assembling member having locating teeth thereon, means to assemble a plurality of pitches of chain elements on said teeth with the elements in adjacent pitches overlapping each other, a pilot pin disposed on one side of said member, and means to force said pin through approximately aligned openings in said elements.

24. In a chain assembling machine, a movable assembling member having locating teeth thereon, means to assemble a plurality of pitches of chain elements on said teeth with the elements in adjacent pitches overlapping each other, a pilot pin disposed on one side of said member, means to force said pin through approximately aligned openings in said elements, means to feed a rivet to the opposite side of said member in line with said pilot pin, means to withdraw said pin, and means to insert said rivet in the openings from which the pin is withdrawn.

25. In a chain assembling machine, a movable assembling member having locating teeth thereon, means to assemble a plurality of pitches of chain elements on said teeth with the elements in adjacent pitches overlapping each other, a pilot pin disposed on one side of said member, means to force said pin through approximately aligned openings in said elements, means to feed a rivet to the opposite side of said member in line with said pilot pin, means to move said rivet into engagement with the end of said pin while in said openings, and means to withdraw said pin and to simultaneously move said rivet into the openings.

26. In a chain assembling machine, a movable assembling member having locating teeth thereon, means to assemble a plurality of pitches of chain elements on said teeth with the elements in adjacent pitches overlapping each other, a pilot pin disposed on one side of said member, means to force said pin through approximately aligned openings in said elements, means to feed a rivet to the opposite side of said member in line with said pilot pin, a rivet transfer adapted to engage the end of the rivet on the side remote from the member, means to operate said transfer to force the other end of the rivet into engagement with the end of said pin, and means to move the pin and transfer in unison with the rivet between them, to withdraw the pin from said openings and to insert the rivet therein.

27. In a chain assembling machine, a movable assembling member having locating teeth thereon, means to assemble a plurality of pitches of chain elements on said teeth with the elements in adjacent pitches overlapping each other, a pilot pin disposed on one side of said member, means to force said pin through approximately aligned openings in said elements, means to feed a rivet to the opposite side of said member in line with said pilot pin, means to withdraw said pin, means to insert said rivet in the openings from which the pin is withdrawn, and means to enlarge the ends of said rivet to prevent removal thereof.

28. In a chain assembling machine, a movable assembling member having locating teeth thereon, means to assemble a plurality of pitches of chain elements on said teeth with the elements in adjacent pitches overlapping each other, means to insert a rivet through aligned openings in said elements, knives on opposite sides of said member, and means to move said knives to cut opposite ends of said rivet.

29. In a chain assembling machine, a movable assembling member having locating teeth thereon, means to assemble a plurality of pitches of chain elements on said teeth with the elements in adjacent pitches overlapping each other, means to insert a rivet through aligned openings in said elements, knives on opposite sides of said member, and a toggle adapted to move said knives against opposite ends of said rivet.

30. In a chain assembling machine, a movable assembling member having locating teeth thereon, means to assemble a plurality of pitches of chain elements on said teeth with the elements in adjacent pitches overlapping each other, means to move said member with said pitches thereon to a different position, a pilot pin at said position on one side of said member adapted to pass through approximately aligned openings in said elements, means to feed a rivet to the side of said member opposite said pin, means to force said rivet into engagement with the ends of said pin, means to force said rivet through said openings, means to move said member to a third position, and means at said third position to enlarge the end of said rivet to prevent removal thereof, said means comprising knives disposed on opposite sides of said member and a toggle for operating said knives in unison.

31. In a chain assembling machine, a rotatable locating wheel mounted on a substantially horizontal axis and having teeth thereon, a plurality of hoppers disposed above said wheel, chutes leading from said hoppers and terminating adjacent the periphery of said wheel, certain of said chutes being adapted to deposit chain links above said wheel in position to be transferred onto the teeth thereon, another chute being adapted to deposit rivets at one side of said wheel in position to be inserted into openings in said links, means to transfer said links to said teeth, and means to transfer said rivets into said openings.

32. In a chain assembling machine, a rotatable locating wheel mounted on a substantially horizontal axis and having teeth thereon, a hopper disposed above said wheel and containing rivets, a chute leading from said hopper, means in said chute forming a plurality of paths through which said rivets may pass, said paths terminating at one side of the teeth on said locating wheel and in registry with holes in chain elements on said teeth, and means for transferring said rivets into said holes.

33. In a chain assembling machine, a rotatable locating wheel having teeth thereon, means to assemble chain elements on said wheel to form a chain, a magnet movably mounted adjacent said wheel, means to move said magnet towards and from the wheel, and means to intermittently energize said magnet whereby when energized it will pull the chain from the wheel.

34. In a chain assembling machine, a chain assembling member comprising a rotatable locating wheel, a plate disposed adjacent the periphery of said wheel and normal to its diameter, said plate having an opening registering with the edge of the wheel, teeth on said periphery having a plurality of circumferentially extending grooves adapted to receive chain elements, a grid closing the opening in said plate with the openings in the grid registering with said grooves, spring pressed fingers adapted to releasably hold a pitch of chain elements adjacent said grid, means to transfer said elements through the openings in the grid into the grooves in said teeth, said fingers being adapted to lift elements prevented by the grid bars from passing to the locating wheel, and to hold them in position.

35. In a chain assembling machine, a rotatable wheel having on its periphery a plurality of spaced transversely extending teeth adapted to receive links of a chain, said teeth having grooves extending circumferentially of the wheel and in which said links may be placed.

36. In a chain assembling machine, a rotatable wheel having on its periphery a plurality of spaced transversely extending teeth adapted to receive links of a chain, said teeth having grooves extending circumferentially of the wheel and in which said links may be placed, means to intermittently rotate said wheel, means to suspend adjacent the periphery of the wheel a pitch of links, and means to transfer said pitch to the grooves in one of said teeth.

37. In a chain assembling machine, a rotatable wheel having on its periphery a plurality of spaced transversely extending teeth adapted to receive links of a chain, means to suspend a pitch of links adjacent the periphery of the wheel, and means to transfer said pitch to position on one of said teeth.

38. In a chain assembling machine, a rotatable wheel having on its periphery a plurality of spaced transversely extending teeth, means to assemble a pitch of links on each tooth, with the links on adjacent teeth overlapping each other, and means to pass a rivet through aligned holes in said overlapping links.

39. In a chain assembling machine, a rotatable wheel having on its periphery a plurality of spaced transversely extending teeth adapted to receive links of a chain, means to suspend a pitch of links adjacent the periphery of the wheel, and means to transfer said pitch to position on one of said teeth by moving them radially inwardly with respect to the wheel.

40. In a chain assembling machine, a rotatable wheel having on its periphery a plurality of spaced transversely extending teeth adapted to receive links of a chain, said teeth having grooves extending circumferentially of the wheel and in which said links may be placed, means to intermittently rotate said wheel, means to suspend adjacent the periphery of the wheel a pitch of links, and means to transfer said pitch to the grooves in one of said teeth by moving them radially inwardly with respect to the wheel.

41. In a chain assembling machine, a rotatable wheel having on its periphery a plurality of spaced transversely extending teeth, means to suspend above the periphery of said wheel a pitch of links, means to transfer said pitch to one of said teeth, means to suspend a second pitch of links above the periphery, and means to transfer said second pitch to a tooth adjacent the first-named tooth with the links overlapping the links of said first-named pitch.

42. In a chain assembling machine, a rotatable wheel having on its periphery a plurality of spaced transversely extending teeth, means to suspend above the periphery of said wheel a pitch of links, means to transfer said pitch to one of said teeth, means to suspend a second pitch of links above the periphery, means to transfer said second pitch to a tooth adjacent the first-named tooth with the links overlapping the links of said first-named pitch, and means to pass rivets through aligned openings in said overlapping links.

43. In a chain assembling machine, a rotatable wheel having on its periphery a plurality of spaced transversely extending elements adapted to receive thereon pitches of chain links, and means removably supporting said elements on said wheel.

44. In a chain assembling machine, a rotatable wheel having on its periphery a plurality of spaced transversely extending elements adapted to receive thereon pitches of chain links, and means removably supporting said elements on said wheel, said means comprising transversely extending slots and means on the elements received in said slots.

45. In a chain assembling machine, a rotatable wheel having on its periphery a plurality of transversely extending teeth adapted to receive pitches of chain links with the links in adjacent pitches overlapping each other, means to feed individual rivets to a position adjacent said teeth and generally parallel thereto, and means to insert a rivet through aligned openings in said overlapping links.

46. In a chain assembling machine, a rotatable wheel having on its periphery a plurality of transversely extending teeth adapted to receive pitches of chain links with the links in adjacent pitches overlapping each other, means to feed individual rivets to a position adjacent said teeth and generally parallel thereto, a pilot pin disposed on one side of said wheel, means to move said pin to said teeth and through generally parallel to said teeth and through aligned openings in said overlapping links, means to withdraw said pin, and means to insert one of said rivets through said openings as the pin is withdrawn.

47. In a chain assembling machine, a rotatable wheel having locating teeth on its periphery, means for assembling chain elements on said teeth, a bearing for said wheel, means to move said bearing to carry the wheel to and from operative position, and co-operating elements, one connected to said wheel and the other connected to said bearing and adapted to locate the wheel with respect to the bearing.

48. In a chain assembling machine, a rotatable wheel having on its periphery a plurality of spaced transversely extending teeth adapted to receive links of a chain, means to assemble pitches of said links on said teeth, with the links in one pitch overlapping the links in adjacent pitches, a vertically extending chute disposed above said wheel, said chute being adapted to receive horizontally disposed rivets therein and being wider than the outside diameter of a rivet but narrower than twice said outside diameter, said chute terminating in a plurality of downwardly extending paths extending at angles to the chute, said paths having lower portions extending parallel to each other and spaced apart a distance equal to a center to center spacing of rivets in said chain and terminating adjacent the periphery of the wheel and at one side thereof, and means to move rivets from the lower ends of said paths laterally into aligned holes in said overlapping links.

FRIEDERICH MÜLLER.